United States Patent [19]

Levake et al.

[11] 3,974,587

[45] Aug. 17, 1976

[54] DETACHABLY FASTENABLE SWIVEL DEVICE

[76] Inventors: Bernice A. Levake; Richard N. Levake, both of 814 Ash St., Spooner, Wis. 54801

[22] Filed: May 20, 1974

[21] Appl. No.: 471,179

[52] U.S. Cl. ............................. 43/42.19; 24/73 TH; 43/44.83
[51] Int. Cl.² .................. A01K 91/04; A01K 85/00
[58] Field of Search............. 43/42.19, 42.11, 44.83, 43/44.84, 44.85, 44.86, 44.98; 24/129 W, 13 Q, 129 C, 73 TH, 73 C, 73 CC, 243 F, 232, 235, 237, 73 SA, 73 AP, 73 RM, 73 MC, 73 HH, 73 HL, 73 HR, 73 CH, 73, 255–257, 261

[56] References Cited
UNITED STATES PATENTS

| 541,120 | 6/1895 | Root | 24/131 R |
| 1,313,372 | 8/1919 | Dodge | 43/44.83 X |
| 1,522,844 | 1/1925 | Swanson | 24/129 W |
| 2,505,306 | 4/1950 | Schmidt | 24/73 TH |
| 2,564,260 | 8/1951 | Houser | 43/44.85 |

FOREIGN PATENTS OR APPLICATIONS

| 538,246 | 3/1957 | Canada | 43/42.19 |

*Primary Examiner*—Louis G. Mancene
*Assistant Examiner*—Peter K. Skiff

[57] ABSTRACT

A detachable fastenable swivel device adapted for use in securing elements of fishing tackle as, for example, hooks to shanks or spoons to swivel around a rod like fishing lure shank. The device comprising a single piece member having an intermediate loop shaped portion and integral opposite end portions formed into generally hook like portions adapted to engage a rod like member for supporting a spoon like spinner thereon or for connecting hooks or other devices to the shanks of lures; said hook portions having bearing portions which are substantially greater than the spaced apart ends and respective shanks of the hook portions so as to maintain the hook portions captive on a rod like member.

7 Claims, 6 Drawing Figures

U.S. Patent   Aug. 17, 1976   3,974,587

DETACHABLY FASTENABLE SWIVEL DEVICE

BACKGROUND OF THE INVENTION

Various detachable fastenable swivel devices have been used for connecting spoon like spinner members or other elements of fishing tackle together. The usual swivel devices is to connect spoons to the rod like members of spinner assemblies have been stamped and formed in such a way that such swivel devices cannot be removed without destroying them and, therefore, usual construction of spinner type lures is such that the spoons cannot be changed or replaced without destroying the swivel elements and/or other portions of the lure.

In many instances, the rod like shank and spinner bearings of a spinner lure assembly are rather expensive and very durable and, in many instances, the spoon like spinner member of such lures becomes damaged or dull and, therefore, ineffective. Accordingly, it has been desirable to replace the spoons but due to the construction of the swivel elements of the lures, this has not been possible within reason.

SUMMARY OF THE INVENTION

The invention comprises a detachably fastenable swivel device which may be used readily to detachably fasten a spoon like spinner member or other device such as a hook to a fishing lure and the detachable features of the device are particularly adapted for detaching and replacing spoon like spinner members to the rod like shanks of such lures, the device comprising a novel and very simple one piece wire member having a loop shaped intermediate portion which passes through an opening in a spoon like spinner member and hook like portions are integral with the intermediate portion and are adapted to engage a rod like shank of a spinner assembly in such a manner as to permit the spoon to swivel around the rod like member and, whereby, it may readily be removed and replaced. The hook portions of the device are provided with bearing portions which are substantially larger than the space between the ends of the hook portions and the respective shanks so that the hook portions are held captive on the rod like member but may be resiliently deflected so as to permit the hooks to be displaced and removed from the rod like member. Additionally, the preferred configuration of the device is one in which the hooks are disposed in adjacent parallel relationship but opposed to each other so that it is necessary to slide the hooks around opposite sides of the rod like member then to rotate the device substantially 90 degrees whereupon the hooks may then be pulled over the rod like device and snapped into position with the bearing portions closely adjacent the rod like member.

Another configuration of the device is one in which the shank portions of the device are twisted together between the loop shaped connection portion and the hook portions which are engageable with a rod like member. The aforementioned twisted shank portions tend to rigidize the device and to provide more precise spaced relation and rigid disposition of the rod member engaging hook portions relative to each other.

Another configuration of the device is one in which both of the hook portions are substantially parallel and directed in the same direction from the loop shaped intermediate portion.

The device with its pair of hook shaped portions integral with an intermediate loop shaped portion is very simple to manufacture and install in connection with rod like shanks of fishing lures with the added advantage that the consumer may readily detach the device from the rod like structure of the lure for replacement of the spoon like spinner members or for changing from one configuration or color to another as desired.

Accordingly, it is an object of the present invention to provide a very simple, economical and reliable detachably fastenable swivel device particularly adapted for fishing lures and to be used in place of the conventional swivels for rotatively supporting a spoon like spinner member on the rod like shank of a lure and also for connecting various other elements such as hooks to the hook end of the lure body or rod as desired.

Another object of the invention is to provide a novel detachably fastenable swivel device having a loop shaped intermediate portion adapted to extend through an opening in a spoon like spinner member and, wherein, opposed hook portions are integral with opposite ends of the intermediate portion of the device, the hook portions being substantially parallel with each other and provided with arcuate bearings which are adapted to engage a rod like member and freely rotate thereon, said hook portions having in portions and shank portions adjacent to the bearing portions which are spaced more closely than the diameter of the rod which they are adapted to be on so that the hook portions are resiliently prevented from becoming inadvertently attached from the rod like member but are resiliently adapted to be deflected with a substantial amount of force so that a person may remove the hook portions from a rod like member and change a spinner or other device as desired.

Another object of the invention is to provide a device of this class having twisted shank portions between the loop shaped intermediate portion and the hook portion so as to rigidize the device for more precise spaced relation of the hook portions and rigidity of their relative disposition with each other.

Another object of the invention is to provide a further configuration of the device wherein, both hook portions are directed in the same direction from the intermediate loop shaped portion of the device.

Further objects and advantages of the invention may be apparent from the following specification, appended claims and accompanying drawings.

DESCRIPTION OF THE PREFERRED EMBODIMENTS

Figure 1:
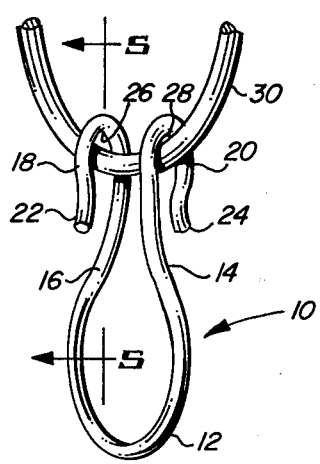
FIG. 1 is a perspective view of the detachably fastenable swivel device shown engaged with a curved rod like member.

As shown in FIG. 1 of the drawings, the detachably fastenable swivel device of the invention is designated 10 and is provided with an intermediate loop shaped portion 12 having integral shank portions 14 and 16, integral with generally U-shaped hook like portions 18 and 20. These hook like portions 18 and 20 have terminal portions 22 and 24 at their ends. The hook like portions are provided with bearing portions 26 and 28 which are shown fitted over a curved rod like member 30.

Figure 5:
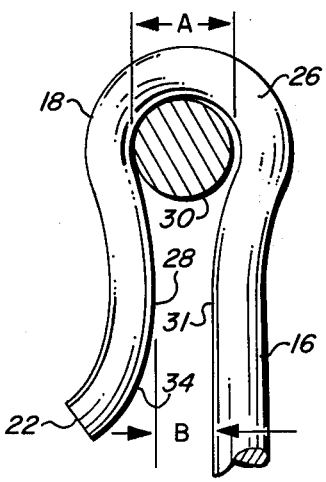
FIG. 5 is an enlarged fragmentary view taken from the line 55 of FIG. 1.

With reference to FIG. 5, it will be seen that the bearing portions 26 and 28 are shown on enlarged scale and since these bearing portions are similar, the bearing portion 26 will be described in FIG. 5 of the drawings.

The bearing portion 26 of the hook shaped portion 18 is arcuate or generally arcuate and is provided with a radius which is one-half the dimension A and thus, this dimension A is substantially twice the radius of the bearing portion 26.

The distance A or twice the radius of the bearing portion 26 is substantially greater than the distance B which is the distance between the shank portion 16 and the hook end portion 28 near the terminus 22, the portion 28 being spaced from the inner surface 30 of the shank 16 all as shown best in FIG. 5 of the drawings. Accordingly, the space B is substantially less than twice the radius of the bearing portion 26.

Figure 2:
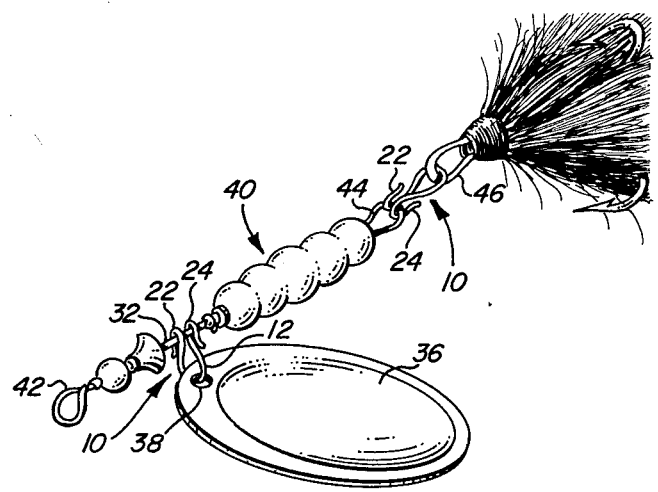
FIG. 2 is a perspective view of the device on a reduced scale showing the device having its loop shaped portion extended through an opening of a spoon like spinner member and the hook portions thereof partially surrounding a rod like member of a fishing lure.
Figure 3:
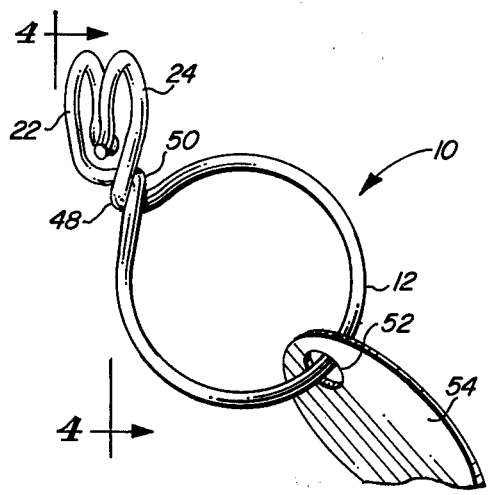
FIG. 3 is a perspective view of a modification of the invention having its loop shaped portion extending through the opening in a spoon like spinner member.
Figure 4:
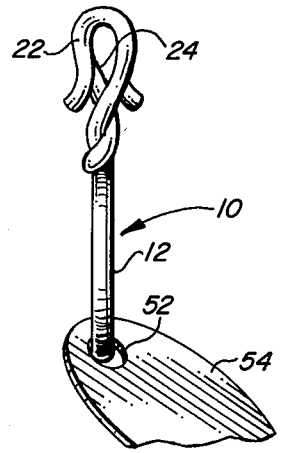
FIG. 4 is a view taken from the line 44 of FIG. 3.

This bearing portion 26 is adapted to be close to the diameter of a rod like member 30 or to a rod like member 32 of a lure shown in FIG. 2 of the drawings. Accordingly, the bearing portion 26 is adapted resiliently to snap over the cross section of the rod like member 30 or the rod like member 32.

Inasmuch as the hook portions shown in FIG. 1 are disposed in opposite directions and are substantially parallel with each other, they are also spaced apart so that they may be disposed on opposite sides of the rod 30 initially and in that position they are slideably moved so that the rod 30 is approaching the inside of the intermediate loop shaped portion 12 beyond the terminal portions 22 and 24 are the loop portions 18 and 20 whereupon the device may be rotated substantially 90 degrees so as to align the hooks 18 and 20 at right angles to the rod 30 whereupon the hook portions 22 and 24 at their outwardly curve portions 34 may be slid over and resiliently deflected such that the cross section of the rod 30 will be admitted between the hook portion 28 and the shank portion 30 as shown in FIG. 5 of the drawings. In this manner, the rod is resiliently captivated in the bearing portion 26 and the corresponding bearing portion of the hook like portion 20.

The detachably fastenable swivel device 10 shown in FIG. 2 of the drawings is disposed in combination with a conventional spoon like spinner 36 having an opening 38 there through the intermediate loop shaped portion 12 of the device 10 extends through the opening 38 while the hook like portions 26 and 28 at their respective bearing portions 26 partially surround the rod like member 32 of the fishing lure 40 shown in FIG. 2 of the drawings.

The bearing portions 26 as shown in FIG. 2 of the drawings are similar to that as shown in FIG. 5 of the drawings and the diameter of the rod 32 is similar to the diameter of the rod 30 shown in FIG. 5 of the drawings so that the swivel bearing relationship of the hook portions 22 and 24 is intimate and efficient so as to provide accurate and free swiveling of the spoon like spinner 36 about the axis of the rod 32.

The rod 32 has one end provided with a fishing line attachments loop 42 and an opposite end with a similar loop 44 for attachment of a hook assembly 46.

In this position another of the detachably fastenable swivel device 10 is used wherein the hook like portions 22 and 24 are engaged in the portion 44 which is similar to the curved rod 30 shown in FIG. 1.

It will be understood that the swivel device of the invention is adapted to swivel in full rotation around a rod or it may swivel in a reciprocal manner such as may be the case in connection with the generally loop shaped end 44 of the rod 32 shown in FIG. 2 of the drawings.

In the modification of the invention, the device is provided with shank portions 48 and 50 which are similar to the shank portions 14 and 16 but these portions 48 and 50 are twisted together to provide a very rigid relationship between the hook shaped portions 22 and 24 so as to hold them in juxtaposition relative to each other. These twisted portions 48 and 50, however, may be slightly separated to allow threading of an end portion 52 of a spinner member 54 there between for assembly or replacement as desired.

Figure 6:
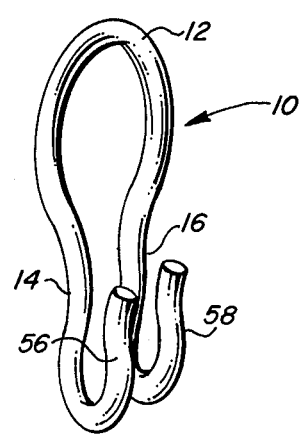
FIG. 6 is a perspective view of a modification of the invention showing the swivel hook portions thereof, disposed in the same direction as compared to the opposed relation of the swivel hooks as shown in FIG. 1 of the drawings.

In the modification as shown in FIG. 6, the device 10 is provided with an intermediate loop shaped portion 12 and integral shank portions 14 and 16 as well as a pair of hook portions 56 and 58 which are similar in every detail with the hook portions 18 and 20; however, these portions are substantially parallel with each other and disposed in the same direction rather than being opposed as shown in FIG. 1 of the drawings.

The details of the hook portions 56 and 58 are as shown in FIG. 5 and as hereinbefore described.

It will be appreciated that the hook portions 56 and 58 extending in the same direction may be more easily connected or disconnected relative to a rod member such as the rod 30 shown in FIG. 5, however, the opposed hook portions of the device as shown in FIG. 1 require that the device must be operated in such a way that the hook portions are first disengaged resiliently from the rod 30 and then must be rotated 90 degrees and then moved from the rod 30. Accordingly, the opposed hook portions as shown in FIG. 1 may be slightly more difficult to attach to a rod like member but offer an attachment facility which is less likely to become disconnected from its respective rod like member 30 or a rod like member 32 as hereinbefore described.

It will be obvious that various modifications may be resorted to without departing from the spirit of the invention.

We claim:

1. A detachably fastenable swivel device comprising: a single piece of wire having an intermediate portion and opposite end portions; said intermediate portion having a generally loop shaped configuration; said opposite end portions each having a substantially U-shaped hook like portion; each hook like portion of said opposite end portions being substantially parallel with and adjacent to each other; said hook like portions of each of said opposite end portions also being directed in opposed relation to each other; said opposite end portions also being slightly spaced apart where they are substantially parallel with each other; each of said hook like portions is provided with a shank portion and a hook end portion; each hook like portion having a generally arcuate concave bearing portion between said shank portion and said hook end portions; said shank portion being spaced from said hook end portion a distance substantially less than twice the radius of said generally arcuate bearing portion.

2. The invention as defined in claim 1, wherein: said hook end portion being curved away from said shank portion and having an extremity which is spaced from said shank portion a distance substantially greater than twice the radius of said generally arcuate bearing portion.

3. The invention as defined in claim 5, wherein: a fishing lure is provided with a rod like member, having first and second ends; both of said generally arcuate bearing portions disposed in partially surrounding relation to said rod like member; said like member being generally circular in corss section and having a diameter larger than said distance.

4. The invention as defined in claim 7, wherein: said rod like member is provided with means at said first end for connection to a fishing line.

5. The invention as defined in claim 8, wherein: said rod like member is provided with means at said second end adapted for connection with a fishing hook.

6. The invention as defined in claim 5, wherein: a spoon like spinner member is provided with a connection opening therein; said intermediate portion of said device extending through said opening.

7. The invention as defined in claim 6, wherein: said hook like portion of each of said opposite end portions also being directed in opposed relation to each other; said opposite end portions also being slightly spaced apart where they are substantially parallel with each other.

* * * * *